(12) United States Patent
Miller (10) Patent No.: US 8,650,307 B2
(45) Date of Patent: *Feb. 11, 2014

(54) SYSTEM FOR AUTOMATED DEVICE-TO-DEVICE TRANSFER

(76) Inventor: Michael J. Miller, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,433

(22) Filed: Oct. 15, 2009

(65) Prior Publication Data

US 2010/0042729 A1  Feb. 18, 2010

Related U.S. Application Data

(63) Continuation of application No. 11/701,367, filed on Feb. 2, 2007, now Pat. No. 7,624,185, which is a continuation of application No. 09/953,408, filed on Sep. 17, 2001, now Pat. No. 7,191,233.

(51) Int. Cl.
*G06F 15/16* (2006.01)

(52) U.S. Cl.
USPC ........................................... 709/227; 709/228

(58) Field of Classification Search
USPC .......................................... 709/227; 713/182
See application file for complete search history.

(56) References Cited

U.S. PATENT DOCUMENTS

| | | | |
|---|---|---|---|
| 5,721,817 A * | 2/1998 | Kurihara et al. | 709/227 |
| 5,860,073 A | 1/1999 | Ferrel | |
| 5,899,975 A | 5/1999 | Nielsen | |
| 5,960,337 A | 9/1999 | Brewster | |
| 6,041,357 A | 3/2000 | Kunzelman | |

(Continued)

FOREIGN PATENT DOCUMENTS

WO    WO98/44424    10/1998

OTHER PUBLICATIONS

U.S. Appl. No. 60/041,623, filed Mar. 1997.

(Continued)

*Primary Examiner* — Ninos Donabed
(74) *Attorney, Agent, or Firm* — William H. Bollman (57) ABSTRACT

A session transfer module of a session server provides the capability to a user to direct a transfer of an on-going session from one device to another device while maintaining the session. The session transfer module is invoked by a user in a way consistent with the user interface of the client application, including by a graphical user command, a command line prompt, or a voice command. The client provides a selection of possible devices that may receive the redirected session. The session transfer module receives the selected device with the session redirect command over a communication network. The communication network may be wired (e.g., public switched telephone network ("PSTN"), Internet, etc.,) a wireless network (e.g., digital telephone network, pager network, etc.,) or a combination of the wired and wireless networks. The session transfer module may be configured to discontinue the session with the current device and to block any subsequent messages of the transferring session from reaching the device. The session transfer module may be further configured to access a device profile from a device profile database to convert the blocked messages into a format compatible to the format and/or modality of the redirected device. The session transfer module may be further configured to push the session to the redirected device in response to an activation (e.g., log-on) of the redirected device by the user. Alternatively, the session transfer module may be further configured to push the session back to the device in response to a time-out in the activation of the redirected device.

6 Claims, 4 Drawing Sheets

(56) References Cited

U.S. PATENT DOCUMENTS

| | | | |
|---|---|---|---|
| 6,085,247 A * | 7/2000 | Parsons et al. | 709/227 |
| 6,169,515 B1 | 1/2001 | Mannings | |
| 6,182,116 B1 | 1/2001 | Namma | |
| 6,199,107 B1 | 3/2001 | Dujari | |
| 6,223,289 B1 | 4/2001 | Wall | |
| 6,230,173 B1 | 5/2001 | Ferrel | |
| 6,269,336 B1 | 7/2001 | Ladd | |
| 6,338,082 B1 | 1/2002 | Scheider | |
| 6,366,934 B1 | 4/2002 | Cheng | |
| 6,397,246 B1 | 5/2002 | Wolfe | |
| 6,397,259 B1 | 5/2002 | Lincke | |
| 6,430,624 B1 | 8/2002 | Jamtgaard | |
| 6,519,643 B1 * | 2/2003 | Foulkes et al. | 709/227 |
| 6,578,056 B1 | 6/2003 | Lamburt | |
| 6,601,101 B1 * | 7/2003 | Lee et al. | 709/227 |
| 6,601,108 B1 | 7/2003 | Marmor | |
| 6,788,949 B1 * | 9/2004 | Bansal | 455/519 |
| 6,804,372 B1 | 10/2004 | Kondo | |
| 6,804,558 B2 * | 10/2004 | Haller et al. | 607/30 |
| 6,826,613 B1 | 11/2004 | Wang | |
| 6,871,213 B1 | 3/2005 | Graham | |
| 6,877,095 B1 | 4/2005 | Allen | |
| 6,894,984 B2 | 5/2005 | Wastlhuber | |
| 6,925,307 B1 | 8/2005 | Mamdani | |
| 6,937,869 B1 | 8/2005 | Rhyburn | |
| 6,954,751 B2 | 10/2005 | Christfort | |
| 6,973,505 B1 | 12/2005 | Schneider | |
| 6,983,370 B2 * | 1/2006 | Eaton et al. | 713/182 |
| 6,988,126 B2 * | 1/2006 | Wilcock et al. | 709/204 |
| 6,990,513 B2 * | 1/2006 | Belfiore et al. | 709/203 |
| 7,043,255 B1 | 5/2006 | Tiwari | |
| 7,072,987 B2 * | 7/2006 | Jurisch et al. | 709/249 |
| 7,092,370 B2 * | 8/2006 | Jiang et al. | 370/329 |
| 7,099,946 B2 * | 8/2006 | Lennon et al. | 709/227 |
| 7,149,773 B2 * | 12/2006 | Haller et al. | 709/203 |
| 7,191,245 B2 | 3/2007 | Takayama | |
| 7,263,551 B2 | 8/2007 | Belfiore | |
| 7,324,556 B2 | 1/2008 | Hoff et al. | |
| 7,426,535 B2 | 9/2008 | Gershman | |
| 7,454,462 B2 | 11/2008 | Belfiore | |
| 7,487,248 B2 * | 2/2009 | Moran et al. | 709/227 |
| 7,624,185 B2 * | 11/2009 | Miller | 709/227 |
| 7,818,664 B2 | 10/2010 | Gordon | |
| 2001/0005809 A1 | 6/2001 | Ito | |
| 2001/0025306 A1 * | 9/2001 | Ninokata et al. | 709/218 |
| 2001/0029322 A1 * | 10/2001 | Iliff | 600/300 |
| 2001/0036835 A1 | 11/2001 | Leedom | |
| 2001/0056354 A1 | 12/2001 | Feit | |
| 2002/0002599 A1 | 1/2002 | Arner | |
| 2002/0002602 A1 | 1/2002 | Vange | |
| 2002/0010716 A1 | 1/2002 | McCartney | |
| 2002/0029089 A1 | 3/2002 | Ueda | |
| 2002/0049790 A1 | 4/2002 | Ricker | |
| 2002/0059425 A1 * | 5/2002 | Belfiore et al. | 709/226 |
| 2002/0065064 A1 | 5/2002 | Griffith | |
| 2002/0143971 A1 | 10/2002 | Govindarajan | |
| 2002/0169539 A1 | 11/2002 | Menard | |
| 2002/0178342 A1 | 11/2002 | Noguchi | |
| 2003/0158897 A1 | 8/2003 | Ben-Natan | |
| 2004/0213207 A1 * | 10/2004 | Silver et al. | 370/352 |
| 2005/0272443 A1 | 12/2005 | Hose | |
| 2007/0201622 A1 | 8/2007 | Croak | |
| 2007/0266176 A1 | 11/2007 | Wu | |
| 2008/0178072 A1 | 7/2008 | Fiedorowicz | |
| 2010/0268773 A1 | 10/2010 | Hunt | |

OTHER PUBLICATIONS

Pinto, Alexandre S., "TINA-based Environment for Mobile Multimedia Services," 1999, TeleCommunications Information Net-working Architecture Conference Proceedings. 1999, IEEE, Piscataway, NJ, Apr. 12, 1999, pp. 54-65.

* cited by examiner

SYSTEM FOR AUTOMATED DEVICE-TO-DEVICE TRANSFER

This application is a continuation of U.S. application Ser. No. 11/701,367, to Miller, entitled "System for Automated Device-to-Device Transfer System," filed Feb. 2, 2007 now U.S. Pat. No. 7,624,185; which is a continuation of U.S. application Ser. No. 09/953,408, to Miller, entitled "System for Automated, Mid-Session, User-Directed, Device-to-Device Session Transfer System," filed on Sep. 17, 2001, now U.S. Pat. No. 7,191,233, the entirety of both of which are expressly incorporated herein by reference.

TECHNICAL FIELD

The invention generally relates to session management in a distributed computer network. More particularly, the invention relates to a user-directed transfer of an on-going software-based session from one device to another device.

DESCRIPTION OF THE RELATED ART

In today's information intensive society, it is not uncommon for a user to have several communication-enabled devices (e.g., a cellular phone, a pager, a wireless personal digital assistant). A typical user may have a desktop computer system to perform information transactions (or sessions) such as sending/receiving electronic mail ("e-mail"), browsing the Internet for information and communicating via instant messaging. However, the size and weight of a typical desktop computer system are among several features that prevent users from taking a desktop computer system while the users are mobile. Moreover, the typical communication conduits that provide session services to desktop computer systems are normally tied to stationary interfaces.

As a result, many users have turned to a variety of untethered and lighter weight devices to perform these information transactions while the user is mobile. Laptop computers with wireless modems are an example, as are enhanced text pagers, wireless handheld devices, personal digital assistants (PDA), and wireless mobile phones with integrated displays. The wireless handheld may have a small screen with a reduced keyboard coupled in a compact form factor. The form factor is typically small enough to allow the wireless handheld to be carried around conveniently on a user. Wireless handhelds typically have the capability to perform similar information transactions that a user would expect from his/her desktop computer in a formal compatible with the reduced screen size.

Along with wireless handhelds, personal digital assistants ("PDAs") and Wireless Application Protocol ("WAP") telephones have also been configured to perform similar information transactions but formatted to conform to the limitations of the respective graphical interfaces, as well as other limitations, of each type of device. With the wide variety of devices, a user may have many options in which to conduct a software application session. In fact, many users often have multiple communication-enabled devices.

However, a user may be conducting a session on a first device and wish to switch to a second device. This decision may be based on a variety of factors such as proximity to the second device, mobility of the second device, safety concerns, a preference for a particular type of graphical user interface, modality of interaction with the user interface, or other additional capabilities of the second device, etc. In conventional systems, the user would have to discontinue the current session on the first device and reinitiate a new session on the second device. Although reinitiating a new session on a second device is an adequate solution, a user may be facing the loss of a session history of the session, a time delay related to the logging off and reinitiating, or other similar inconveniences. Accordingly, the conventional technique of switching devices may not be entirely satisfactory.

SUMMARY OF THE INVENTION

In accordance with the principles of the present invention, a method for redirecting an on-going, software-based session is disclosed. The method includes conducting a session with a first device and specifying a second device. The method further includes discontinuing the session on the first device and resuming the session on the second device. In addition to transferring from device to device, the data might need to be changed, either in format, for instance from HTML to WML, or in modality, for instance from voice to text or text to voice.

One aspect of the present invention provides for a system for transferring a session. The system includes a network, a first device, a second device, and a session server. The session server is configured to provide a session service between the first device and the session server over the network. The session server is further configured to transfer a session from the first device to the second device in response to a redirect command from the first device.

Another aspect of the present invention provides for a computer readable storage medium on which is embedded one or more computer programs. The one or more computer programs are implementing a method for redirecting a session. The one or more computer programs includes a set of instructions for conducting a session with a first device and specifying a second device. The set of instructions further include discontinuing the session on the first device and resuming the session on the second device.

Additional aspects and novel features of the invention will be set forth in part in the description which follows and in part will become apparent to those skilled in the art upon examination of the following or may be learned by practice of the invention.

DESCRIPTION OF DRAWINGS

Features and aspects of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. Although an embodiment of the invention may be practiced in an instant messaging environment or a Web browsing environment, one of ordinary skill in the art will readily recognize that the same principles are equally applicable to, and can be implemented in, any session-oriented environments, and that any such variation does not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a session transfer module of a session server provides the capability to initiate a transfer of an on-going session from a first device to a second device while maintaining the session and its context. The session transfer module may be invoked by a client software application executing on the first device in a way consistent with the modality of the user interface, including by a graphical user command selection, a voice command, or a command line prompt. The client of the first device may be configured to provide a selection of possible devices that may receive the redirected session. The session transfer module may be further configured to receive the identification of the selected second device (or redirected device) with the session redirect command over a communication network. The communication network may be a wired (e.g., public switched telephone network ("PSTN"), Internet, etc.,) a wireless network (e.g., digital telephone network, pager network, etc.,) or a combination of the wired and wireless networks.

The session transfer module may be further configured to discontinue the session with the first device and to block any subsequent messages of the transferring session from reaching the first device. The session transfer module may be further configured to access a device profile from a device profile database to convert the blocked messages as well as the messages comprising the prior message history (or session history) into a format compatible with the redirected device, where the format may include parameters such as data format, modality, etc. The session transfer module may be further configured to push the session to the redirected device either asynchronously or in response to an activation (e.g., log-on) of the redirected device by the user. Additionally, the session transfer module may be further configured to push the session back to the first device in response to a time-out in the activation of the redirected device.

In another aspect of the present invention, the session transfer module may be configured to accept a session history of a first device during the redirection process. The first device may be provided with the capability of transmitting the session history of the session to the session transfer module. The session transfer module may be configured to direct a data handler module to reformat the session history to conform to the data format and/or modality compatible according to the redirected device profile in response to the receipt of the session history. Subsequently, the session transfer module may be further configured to transmit the reformatted session history to the redirected device. Thus, a user may be provided with a complete history of the session at the redirected device.

Alternatively, the session transfer module may access a session history of the session maintained by a session handler module. The session handler module may be configured to provide the session management tasks between a device and the session server, which may include maintaining a session history of the session. The session transfer module may be further configured to direct a data handler module to reformat the session history to conform to the data format and/or modality compatible according to the redirected device profile. Subsequently, the session transfer module may be further configured to transmit the reformatted session history to the redirected device. Thus, a user may be provided with a complete history of the session at the redirected device.

Figure 1:
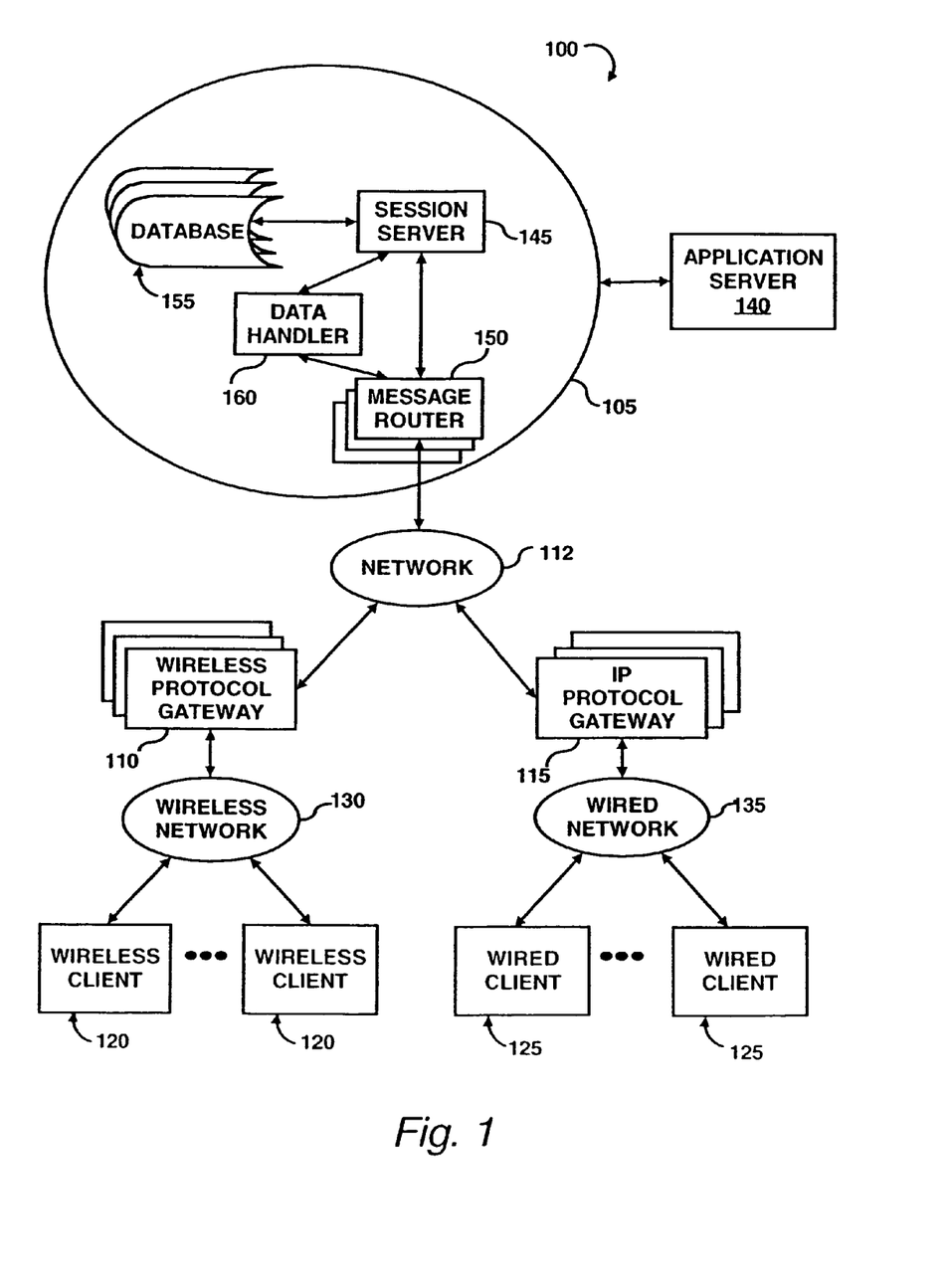
FIG. 1 illustrates a computer network in which an exemplary embodiment of a session transfer module may be implemented.

FIG. 1 illustrates a communication network 100 where an exemplary embodiment may be practiced in accordance with the principles of the present invention. In particular, the communication network 100 includes an application services network 105, one or more protocol gateways that may be wireless-based 110 or wire-based (e.g., an Internet Protocol ("IP") protocol gateway 115), and wireless and wired clients, 120 and 125, respectively.

The wireless and wired protocol gateways, 110 and 115, may be configured to interface with the application services network 105 via a network 112. The network 112 may be configured to provide a communication channel between the application services network 105 and the protocol gateways, 110 and 115. The network 112 may be implemented by a local area network, a token ring network, a wide area network, the Internet or some combination thereof.

The wireless protocol gateway 110 may be further configured to interface with the wireless clients 120 via a wireless network 130. The wireless network 130 may be configured to provide wireless communication protocol support for the wireless clients 125. The wireless network 130 may be configured to support wireless network protocols such as Cellular Digital Packet Data, Mobitex, IEEE 801.11b, Wireless Application Protocol, Global System for Mobiles, and other similar protocols.

The wireless clients 120 may be implemented on a text-pager, a personal digital assistant, a wireless mobile telephone with or without integrated displays and other similar devices. Each of the wireless clients 120, as well as the wired clients 125, may be configured to execute a client program which may be implemented as a software program, utility and/or subroutine to interface with the application services network 105. The client may be configured to provide the software (e.g., utilities, application specific software, etc.,) to support the session services designated for each type of wireless/wired client devices, 120 and 125. Moreover, a client may be configured to have a preferred mode of interaction, i.e., modality. For instance, a client may be configured to provide a graphical manner, e.g., a graphical user interface, to redirect or transfer command for transferring a current session of client to another device without discontinuing the session. Alternatively, a client may be configured to provide a command line prompt for a user to input the redirect command into the client. Alternatively, a client may be configured to provide a voice command to input the redirect command into the client. It is to be understood that this invention is not limited to these modes of user interaction with the client application.

The client software of the wireless/wired client devices, 120 and 125 may be further configured to provide a selection of devices that a transferring session may be redirected thereto. The selection may be provided in a graphical method (e.g., a dialog box, a menu selection, etc.) according to the constraints of each device. The selection of the redirected device may also be forwarded from the user of a wireless/wired client device, 120 and 125 to the session server 140.

Similarly, the wired protocol gateways 115 may be configured to interface with the wired clients 120 via a wired network 135. The wired network 135 may be configured to provide wired communication protocol support for the wired clients 125. The wired network 135 may be configured to support protocols such as Transmission Control Protocol/Internet Protocol, X.25, IEEE 802.5, IEEE 802.3, Asynchronous Transfer Mode, and other network protocols.

The wired clients 125 may be implemented as a laptop computer with a telephone modem, a desktop computer with a telephone modem, server/client, and other similar computing platforms. Each of the wired clients 125 may be configured to execute a client implemented by a software program, utility and/or subroutine to interface with the wired network 135 and, subsequently, the application services network 105. Accordingly, messages from wireless clients 120 and/or wired clients 125 are transmitted to their protocol gateways, 110 and 115, respectively, over their respective networks, 110 and 115, respectively. The protocol gateways, 110 and 115, may be configured to encapsulate the transmitted messages to the network protocol of the application services network 105. Similarly, as messages are transmitted from the application services network 105 to the clients, 120 and 125, the protocol gateways, 110 and 115, reformat the transmitted messages into the respective network protocol of the clients, 120 and 125.

The application services network 105 may be configured to provide a variety of services to the wireless and wired clients, 120 and 125, respectively. These services may include session-based services such instant messaging, database querying, and other similar services. The supporting applications of these session based-services may be provided by an application server 140. The application server 140 may be configured to provide an application such as instant messaging application, a web application, a database querying application, and other similar applications. The application server 140 may be implemented by any number of commercially available servers or high performance computers. Because the specific type of session to be used in the present invention will vary according to individual needs, the present invention is not limited to any specific type of session and may thus utilize any type of session that may be provided to a user which may reasonably accomplish the goals of the present invention.

The application server 140 may be further configured to interface with the components of the application services network 105, which may include a session server 145, a plurality of message routers 150, a plurality of databases 155, and a data handler module 160.

The session server 145 may be configured to provide session-based services to the users of the wireless and wired clients, 120 and 125. A session-based service may be an instant messaging service, messaging service, a database query, a Web browsing session, and the like. Additionally, although FIG. 1 depicts a single session server 145, it is to be understood that the present invention is not limited to one session server, but rather, the present invention may include any reasonable number of session servers, clustered or otherwise configured to interoperate. Accordingly, the single session server depicted in FIG. 1 is for illustrative purposes only and thus is not meant to limit the present invention in any respect.

The session server 145 is further configured to interface with the message routers 150. The message routers 150 may be configured to authenticate the messages of the session between wireless/wired clients, 120 and 125, and the session server 145. The message routers 150 may be further configured to route the messages of the session between the session server 145 and to the appropriate protocol gateway, 110, 115, of the communication network 100 depending on the network used by the wireless/wired clients, 120 and 125. Additionally, the message routers 150 may be further configured to transfer messages to and from the application server 140 directly. Thus, for example, wired client 125 may communicate with a wireless client 120.

The session server 145 may be configured to access the databases 155 to retrieve information to support the type of session services provided to each user and to ascertain the validity of each user. The databases 155 may be implemented in a variety of ways. However, as is readily apparent to those of ordinary skill in the art, the differences among the variety of implementations have no effect on the scope and spirit of the present invention. Additionally, the databases 155 may be configured to provide device profile information to the device manager 215 and/or user preference data to the application server 140.

The session server 145 may be further configured to interface with the data handler module 160. The data handler module 160 may be configured to provide data transformation services for the session server 145

Although FIG. 1 illustrates an example of the logical configuration of the various components of the of the application services network 105, it should be noted that that the various components may be physically linked in a variety of methods such as a local area network, a bus architecture, and other similar networking architecture. Accordingly, the configuration of the application services network 105 depicted in FIG. 1 is for illustrative purposes only and thus is not meant to limit the present invention in any respect.

Figure 2:
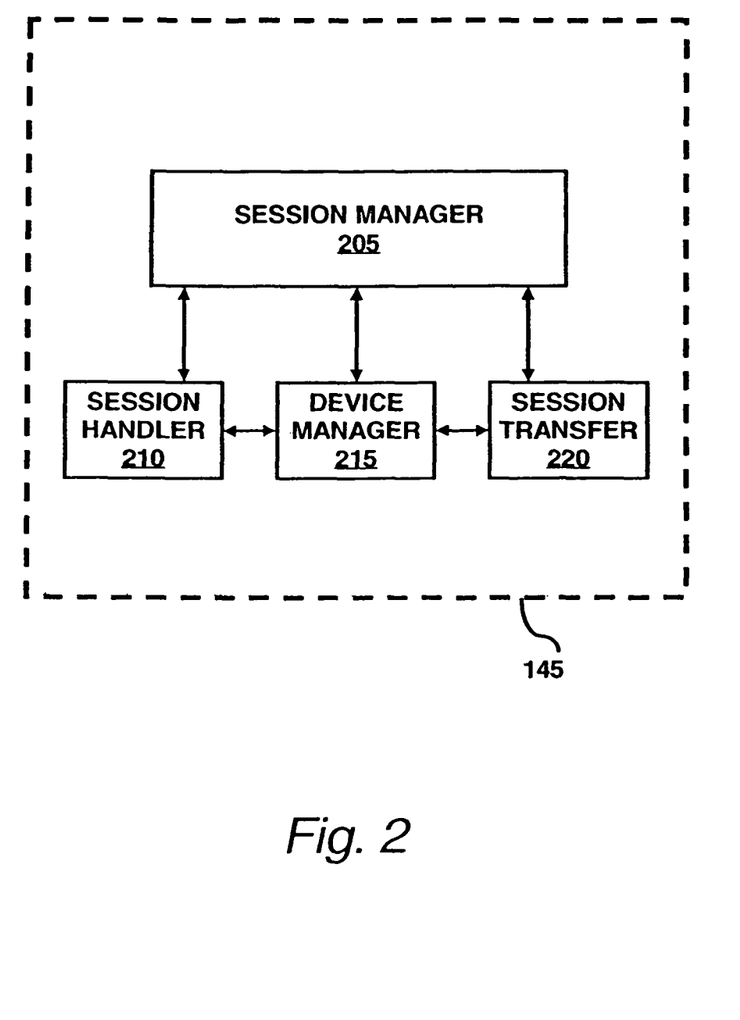
FIG. 2 illustrates a software architecture of an exemplary embodiment of the session transfer module according to the principles of the present invention.

FIG. 2 illustrates a block diagram of the software architecture of an exemplary embodiment of the session transfer module included in the session server 145 shown in FIG. 1. In particular, the session server 145 includes a session manager 205, a session handler 210, a device manager 215, and a session transfer module 220.

The session manager 205 of the session server 105 may be configured to provide the management function for the session server 105 for the users. The management functions may include determining the type of services available to a user, the number of sessions, load-balancing of the sessions, registration of new users, etc.

As part of the session server 145, the session handler module 210 is configured to manage an individual session for each of the wireless/wired clients 120, 125. The session handler module 210 may provide at least authentication of the messages transmitted and message acknowledgement during a session.

Also part of the session server 145, the device manager 215 is configured to provide device profiles to the session handler module 210. A user may be registered to access the session server 145 through multiple devices. When a user logs into the session server 145, the session handler module 210 is notified by a log-on message of the type of client device is being utilized by the user. The session handler module 210 then retrieves the device profile from the device manager 215. The retrieved device profile is then used by the session handler module 210 to transfer information in a data-format and/or modality compatible with the client device. The device manager 215 may be further configured to access database 155 to retrieve the device profile. The device profile may be stored on a single disk of the database 155 or may be stored across multiple disks of the database 155.

The retrieved device profile is also utilized by the data handler module 160 (shown in FIG. 1). The data handler module 160 may be configured to provide data transformation services to the session manager 205. The session transfer module 220 may be configured to provide the capability of transferring a session from one client device of a user to another client device of the user. The session transfer module 220 may be invoked in a way consistent with the client user interface, including by using a graphical command, a command line prompt, or a voice command. The "Redirect" or "Transfer Session" command may be configured to provide a redirected device of the user to accept the transferred session. The session transfer module 220 may be further configured to discontinue or suspend the session with the transferring device and to block any subsequent messages of the transferring session from reaching the transferring device.

The session transfer module 220 of the session server 145 is further configured to access a device profile from the device manager 215 to facilitate the conversion of the blocked messages into a format compatible with the redirected device. The session transfer module 220 is further configured to push the transferring session to the redirected device in response to an activation (e.g., log-on) of the redirected device by the user. Additionally, the session transfer module is further configured to push an alert to the redirected device to notify the user that the session is waiting and that the user can access it by activating the session on the redirected device. Moreover, the session transfer module is further configured to push the session back to the device in response to a time-out in the activation of the redirected device.

The session transfer module 220 may be configured to optionally accept a transaction (or session) history of the transferring device during the redirection process. The device may be provided with the capability of transmitting the session history of the device to the session transfer module 220. The session transfer module 220 may be configured to reformat the session history to conform to the data format and/or modality compatible according to the redirected device profile in response to the receipt of the session history. Subsequently, the session transfer module 220 may be further configured to transmit the reformatted session history to the redirected device. Thus, a user may be provided with a complete history of the session at the redirected device. Alternatively, the session transfer module 220 may be configured to transmit a portion of the session history that is compatible with the memory requirements of the redirected device. This particular feature may be a user preference setting and/or a network administrative setting.

Figure 3:
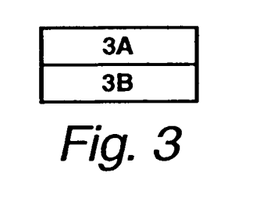
FIG. 3 is a key to FIGS. 3A-3B, which together illustrate an exemplary flow diagram of the session transfer module according to the principles of the present invention.
Figure 3A:
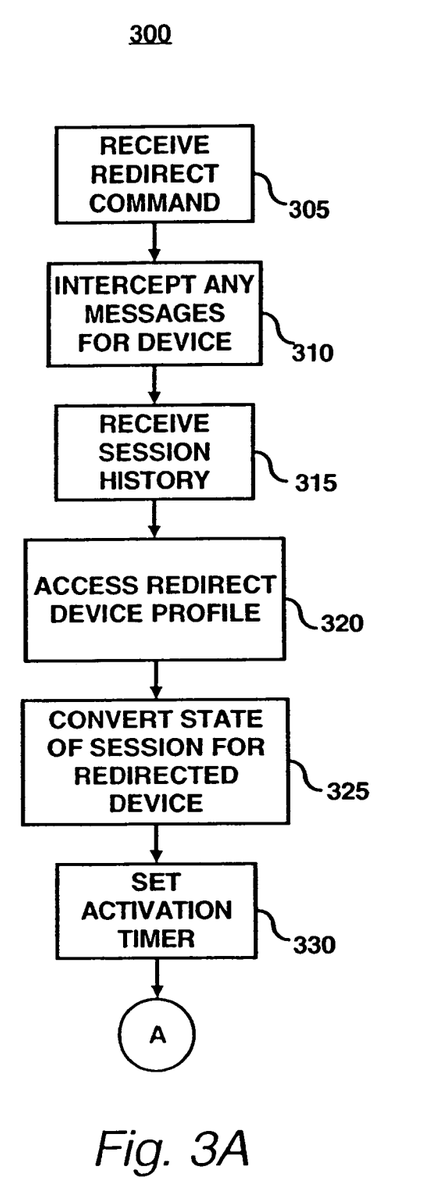
Figure 3B:
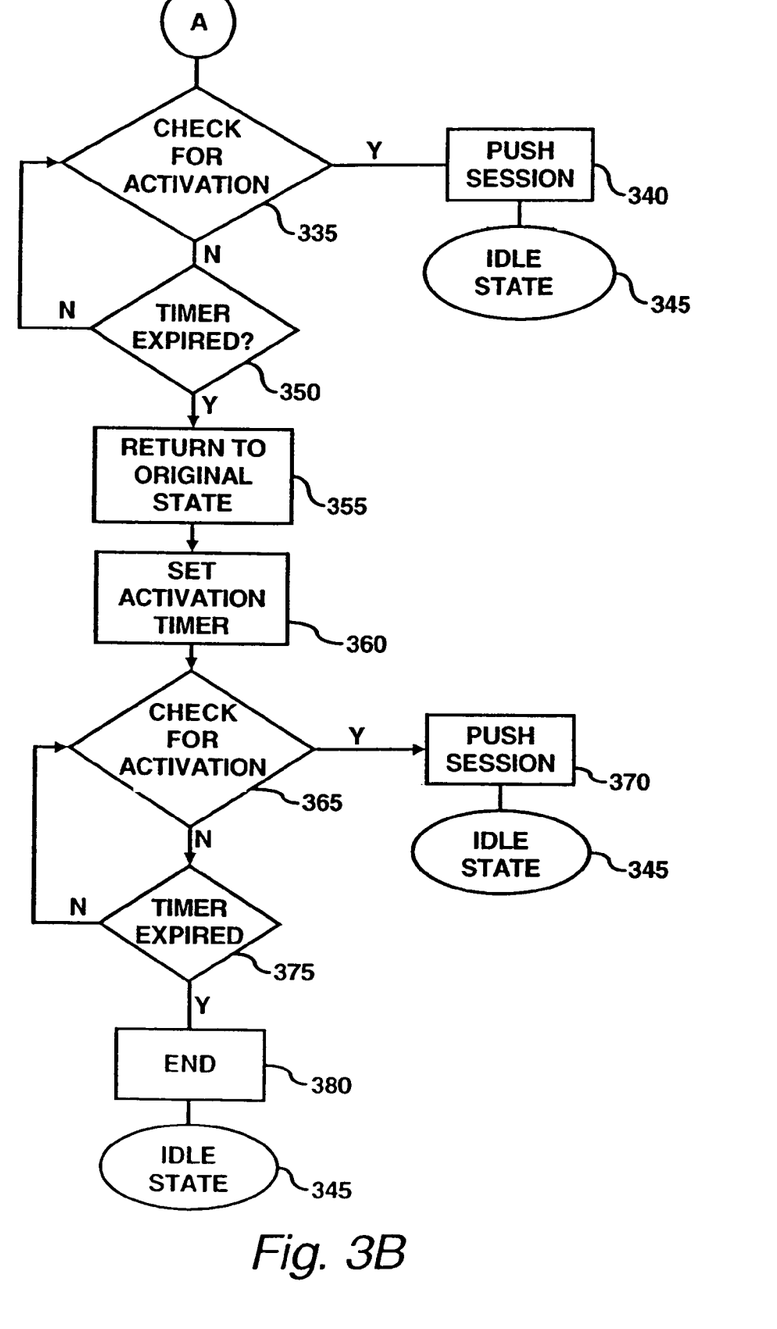

FIGS. 3A-3B, together, illustrate an exemplary flow diagram 300 of the session transfer module 225 of the session server 140 shown in FIG. 2 in accordance with the principles of the present invention. In particular, referring to FIG. 3A, the session transfer module 225 is invoked when the session server 145 receives a redirect or transfer command from a wireless/wired client 120,125, in step 305.

In step 310, the session transfer module 220 is configured to intercept any messages destined for the first client device. Additionally, the session transfer module 220 may be configured to block any messages for the first client device. The intercepted messages or blocked messages may be stored temporarily in a memory in the session server 145 allocated by the session transfer module 220. Any messages queued for transfer from the first client device are subsequently released by the session transfer module 220.

In step 315, the session transfer module 220 may be configured to receive a transaction or session history from the transferring device. The session history may be stored temporarily in a memory space allocated by the session transfer module 220 in the session server 105. Alternatively, the session handler 210 or application server 140 may be configured to maintain a session history of the session for the transferring device, which may be accessed by the session transfer module 220.

In step 320, the session transfer module 220 may be configured to access the device profile of the selected second client (or redirected) device from the device manager 215. The retrieved device profile is utilized by the session transfer module 220 to direct the data handler module 160 to reformat or convert the stored messages into a data format compatible and/or modality (e.g., WML for WAP devices, HDML, for pre-WAP telephones, HTML for desktop browsers, VoiceXML for voice browsers, etc.) with the redirected device.

In step 325, the state of the session is converted to a state compatible with the redirected device by the session transfer module 220 according the device profile. For example, the redirected device may have a different user preference settings, data preferences, modality, and/or command library.

In step 330, the session transfer module 220 sets an activation timer. The activation timer is configured to provide a time limit for the user to log on to the redirected device. The length of the activation timer may be preset by a service provider or the amount of time may be set by the user. Additionally, the session transfer module 220 may be further configured to transmit a notification (or alert) message to the redirected device to inform that a current on-going session is awaiting to be resumed.

Referring to FIG. 3B, in step 335, the session transfer module 220 determines whether the user has activated the redirected device. If the session transfer module 220 detects the activation of the redirected device, in step 340, the session transfer module 220 pushes the converted session to the redirected device over the network 100 as a normal session with the converted transaction log. Subsequently, the session transfer module 220 returns to an idle state, in step 345.

Otherwise, in step 350, the session transfer module 220 determines whether the activation lime has expired. If the activation timer has not expired, the session transfer module 225 returns to step 335. Otherwise, the session transfer module 220 returns the converted state of the session to the original state of the session, in step 355.

In step 360, the session transfer module 220 sets a second activation timer. The second activation timer is configured to provide a time limit for the user to activate (or log on) to the original device.

In step 365, the session transfer module 220 determines whether the user has activated the original device. If the user has activated the original device, the session transfer module 220 pushes the session back to the original device, in step 370. Otherwise, the session transfer module 220 determines whether the second activation timer has expired, in step 375.

If the second activation timer has not expired, the session transfer module 220 returns to step 365. Otherwise, if the second activation timer has expired, the session transfer module 220 is configured to end the session, in step 380 and return to an idle state in step 345.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of transferring a session from a first device to a second device, comprising:
   in response to a second device log-on, transferring an on-going session from a first device;
   obtaining a converting profile specifying a format for said second device;
   converting a session history associated with said on-going session of said first device, to said format that is compatible with said second device;
   communicating said session history to said second device after said second device log-on; and
   transmitting data associated with said on-going session to said second device.

2. The method of transferring a session from a first device to a second device according to claim 1, further comprising:
   pushing said session to said second device in response to said transferring said on-going session transfer.

3. The method of transferring a session from a first device to a second device according to claim 1, further comprising:
   pushing a notification to said second device in response to said transferring said on-going session transfer.

4. A session server for transferring a session from a first device to a second device, comprising:
   receiving, at a physical session server, an on-going session transfer request for initiating an on-going session transfer from a first device to a second device;
   accessing, at said physical session server, a converting profile specifying a format for said second device;
   converting, with said physical session server, a session history relating to said first device, to said format that is compatible with said second device; and
   after a log-on of said second device, communicating said session history associated with said on-going session to said second device.

5. The session server for transferring a session according to claim 4, wherein:
   said physical session server pushes said on-going session to said second device in response to initiation of said automatic session transfer.

6. The session server for transferring a session according to claim 4, wherein:
   said physical session server pushes a notification to said second device in response to initiation of said automatic session transfer.

* * * * *